United States Patent
Tellier et al.

(10) Patent No.: US 11,660,590 B2
(45) Date of Patent: May 30, 2023

(54) PROCESS FOR PREPARING A CATALYST OR A TRAPPING MASS FROM MOLTEN SALTS

(71) Applicant: IFP Energies Nouvelles, Rueil-Malmaison (FR)

(72) Inventors: Elodie Tellier, Rueil-Malmaison (FR); Dominique Decottignies, Rueil-Malmaison (FR); Antoine Fecant, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 243 days.

(21) Appl. No.: 16/558,597

(22) Filed: Sep. 3, 2019

(65) Prior Publication Data
US 2020/0070137 A1 Mar. 5, 2020

(30) Foreign Application Priority Data
Sep. 4, 2018 (FR) ...................................... 1857940

(51) Int. Cl.
*B01J 23/75* (2006.01)
*B01J 37/02* (2006.01)
(Continued)

(52) U.S. Cl.
CPC ........... *B01J 37/0201* (2013.01); *B01J 21/12* (2013.01); *B01J 23/34* (2013.01); *B01J 23/72* (2013.01);
(Continued)

(58) Field of Classification Search
CPC . B01J 23/34; B01J 23/72; B01J 23/745; B01J 23/75; B01J 23/755; B01J 23/80; B01J 37/08
See application file for complete search history.

(56) References Cited

U.S. PATENT DOCUMENTS 4,368,142 A * 1/1983 Frohning ............... B01J 23/755
502/259
5,159,128 A 10/1992 Forschner et al.
(Continued)

FOREIGN PATENT DOCUMENTS

CN 107970907 A * 5/2018
WO 01/19514 A1 3/2001
WO WO-2008090105 A2 * 7/2008 ............ B01J 21/063

OTHER PUBLICATIONS

Machine translation of Wang (CN107970907A), publication date May 1, 2018.*

(Continued)

*Primary Examiner* — Jun Li
(74) *Attorney, Agent, or Firm* — Millen, White, Zelano and Branigan, P.C.; Harry B. Shubin

(57) ABSTRACT

Process for preparing a catalyst or a trapping mass comprising the following steps:
bringing a porous oxide support into contact with a metal salt comprising at least one metal belonging to groups VIB, VIIB, VIIIB, IB or IIB, of which the melting point of said metal salt is between 20° C. and 150° C., for a period of between 5 minutes and 5 hours in order to form a solid mixture, the weight ratio of said metal salt to said porous oxide support being between 0.1 and 1;
heating the solid mixture with stirring at a temperature between the melting point of said metal salt and 200° C. and for 5 minutes to 12 hours;
calcining the solid obtained in the preceding step at a temperature above 200° C. and below or equal to 1100° C. under an inert atmosphere or under an oxygen-containing atmosphere.

9 Claims, 2 Drawing Sheets

(51) Int. Cl.
- *B01J 37/08* (2006.01)
- *B01J 35/10* (2006.01)
- *B01J 23/72* (2006.01)
- *B01J 23/745* (2006.01)
- *B01J 23/80* (2006.01)
- *B01J 23/34* (2006.01)
- *B01J 23/755* (2006.01)
- *B01J 21/12* (2006.01)

(52) U.S. Cl.
CPC ............ *B01J 23/745* (2013.01); *B01J 23/75* (2013.01); *B01J 23/755* (2013.01); *B01J 23/80* (2013.01); *B01J 35/1009* (2013.01); *B01J 35/1014* (2013.01); *B01J 35/1019* (2013.01); *B01J 35/1038* (2013.01); *B01J 35/1042* (2013.01); *B01J 35/1047* (2013.01); *B01J 37/0236* (2013.01); *B01J 37/08* (2013.01)

(56) References Cited

U.S. PATENT DOCUMENTS

| | | |
|---|---|---|
| 6,369,000 B1 | 4/2002 | Johnson et al. |
| 2005/0227866 A1* | 10/2005 | Berge .................. B01J 23/75 502/325 |
| 2009/0023822 A1* | 1/2009 | Tijm .................... B01J 23/94 502/259 |
| 2013/0116351 A1* | 5/2013 | Querner ............ B01J 37/0036 502/328 |
| 2015/0314264 A1 | 11/2015 | Caskey et al. |

OTHER PUBLICATIONS

French Search Report dated Jun. 6, 2019 issued in corresponding FR 1857940 application (2 pages).

G.J. Baker et al., "A Novel Route to Zeolite-Templated ZnO Quantum Wires", Journal of Physics: Conference Series, vol. 245, No. 1 (2010) pp. 1-4.

* cited by examiner

PROCESS FOR PREPARING A CATALYST OR A TRAPPING MASS FROM MOLTEN SALTS

TECHNICAL FIELD

The present invention relates to the field of the preparation of catalysts or trapping masses having a high degree of metallic active phase loading that are obtained from metallic molten salts. The present invention also relates to the use of such catalysts or trapping masses in industrial processes.

PRIOR ART

Many synthesis processes are known from the prior art for improving the reducibility of the metal phase or else for controlling the particle sizes. Among these methods, the use of molten salts as precursors of the active phase of a catalyst or of a trapping mass is known from the literature.

For example, document U.S. Pat. No. 5,036,032 discloses a method for preparing a cobalt-based supported catalyst by contacting (for a few tens of seconds) a support in a cobalt nitrate molten salt bath, followed by a step of drying and reducing without intermediate calcining. This method enables the preferential localization of the cobalt phase at the periphery of the support. However, the method does not allow a precise control of the amount of active phase (here cobalt) deposited due to the very short contact time and furthermore the type of catalyst obtained is not suitable for use in a reactor operating in the liquid phase with a catalyst in suspension (referred to as a "slurry reactor" or "slurry") owing to the excessive loss of metal by attrition. Moreover, the absence of a calcining step is risky since the reaction between the reducing element and the nitrates in the solid is highly exothermic. Finally, this method makes it necessary to handle large amounts of (toxic) cobalt nitrate in liquid form and at temperature, with ratios of around 4 grams of active phase precursors to 1 gram of support. The catalysts obtained by this preparation route are used for Fischer-Tropsch synthesis of hydrocarbons.

It is known from Chem. Mater., 1999, 11, p. 1999-2007 to prepare mixed phosphates via a molten salt route. The reaction mixture contains a metal precursor salt (notably $Ni(NO_3)_2$ or $Co(No_3)_2$), a source of phosphorus ($NH_4HPO_4$), and an alkali metal (Na or K) nitrate. These preparations are produced at high temperatures of the order of 400° C. to 450° C. Mixed phosphate solids are obtained, for example $Na_3Ni_2(P_2O_7)PO_4$, $K_2Ni_4(PO_4)_2P_2O_7$ or $Na_9Co_3(PO_4)_5$. These solids may find applications in ion exchange, high-temperature ion conductivity or in catalysis.

Document GB 191308864 discloses a process for synthesis of a bulk catalyst based on nickel or cobalt for the production of hydrogen by steam reforming. These catalysts may be obtained by liquefaction of metal salts at moderate temperatures, then cast in a mould before calcining heat treatment.

The publication by J.-Y. Tilquin entitled "*Intercalation of $CoCl_2$ into graphite: Mixing method vs molten salt method*" published in Carbon, 35(2), p. 299-306, 1997, proposes the use, in molten salt form, of a $CoCl_2$—NaCl mixture at high temperature (450-580° C.) for intercalation between graphite sheets. These graphite intercalation compounds find applications in catalysis for the reduction of oxygen in polymer electrolyte fuel cells.

Document EP 2921227 discloses a Fischer-Tropsch catalyst based on a group VIIIB metal deposited on an oxide support comprising alumina, silica, a spinel and phosphorus and also the process for manufacturing same. This process comprises the preparation of the oxide support and also the impregnation of this support with an aqueous solution of a metal precursor followed by drying and calcining. In case of high contents of metals, the impregnation/drying/calcining of the active phase in several steps is preferred.

Subjects of the Invention

The Applicant has surprisingly discovered that it is possible to prepare a catalyst or a trapping mass comprising an active phase having a high content of metal by carrying out a minimum of steps, by carrying out an optimized control of the amount of metal deposited on the catalyst and by reducing the hazardous nature and the cost of said process owing to the minimizing of the amounts of metal precursor used.

One subject according to the invention relates to a process for preparing a catalyst or a trapping mass comprising an active phase based on at least one metal from group VIB, VIIB, VIIIB, IB or IIB and a porous oxide support, said catalyst being prepared by at least the following steps:

a) said porous oxide support is brought into contact with at least one metal salt comprising at least one metal belonging to groups VIB, VIIB, VIIIB, IB or IIB, of which the melting point of said metal salt is between 20° C. and 150° C., for a period of between 5 minutes and 5 hours in order to form a solid mixture, the weight ratio of said metal salt to said porous oxide support being between 0.1 and 1;

b) the solid mixture obtained at the end of step a) is heated with stirring at a temperature between the melting point of said metal salt and 200° C. and with a residence time of between 5 minutes and 12 hours;

c) optionally, the solid obtained at the end of step b) is dried at a temperature below 200° C.;

d) the solid obtained at the end of step b) or c) is calcined at a temperature above 200° C. and below or equal to 1100° C. under an inert atmosphere or under an oxygen-containing atmosphere.

Preferably, said metal is chosen from Zn, Cu, Ni, Fe, Co, Mn.

Preferably, the metal salt is a hydrated nitrate salt.

Preferably, said metal salt is chosen from zinc nitrate trihydrate, zinc nitrate hexahydrate, copper nitrate trihydrate, copper nitrate hexahydrate, nickel nitrate hexahydrate, iron nitrate nonahydrate, cobalt nitrate hexahydrate, manganese nitrate tetrahydrate, manganese nitrate hexahydrate, taken alone or as a mixture.

Preferably, the weight ratio of said metal salt to the porous support is between 0.3 and 0.9.

Preferably, step a) is carried out for 10 minutes to 4 hours.

Preferably, the porous support of said catalyst or trapping mass is chosen from alumina, silica or silica-alumina.

Preferably, the calcining time of step d) is less than 16 hours.

Preferably, said porous support is in the form of a powder having a particle size of between 10 and 500 μm.

Preferably, said porous support comprises a specific surface area of between 5 and 500 $m^2/g$.

Preferably, said porous support has a total pore volume of between 0.3 and 3 ml/g.

Another subject according to the invention relates to the use of the catalyst or of the trapping mass prepared according to the invention in the field of catalytic processes or in the context of processes for purifying gaseous or liquid effluents.

Preferably, the catalytic processes are chosen from hydrogenation reactions of aromatic or polyaromatic compounds, selective hydrogenation reactions of polyunsaturated compounds, Fischer-Tropsch synthesis.

Preferably, the processes for purifying gaseous or liquid effluents are chosen from the purification of liquid hydrocarbon feedstocks, natural gases, synthesis gases containing sulfur-containing impurities or halogenated impurities.

DETAILED DESCRIPTION OF THE INVENTION

Definitions

Figure 1:
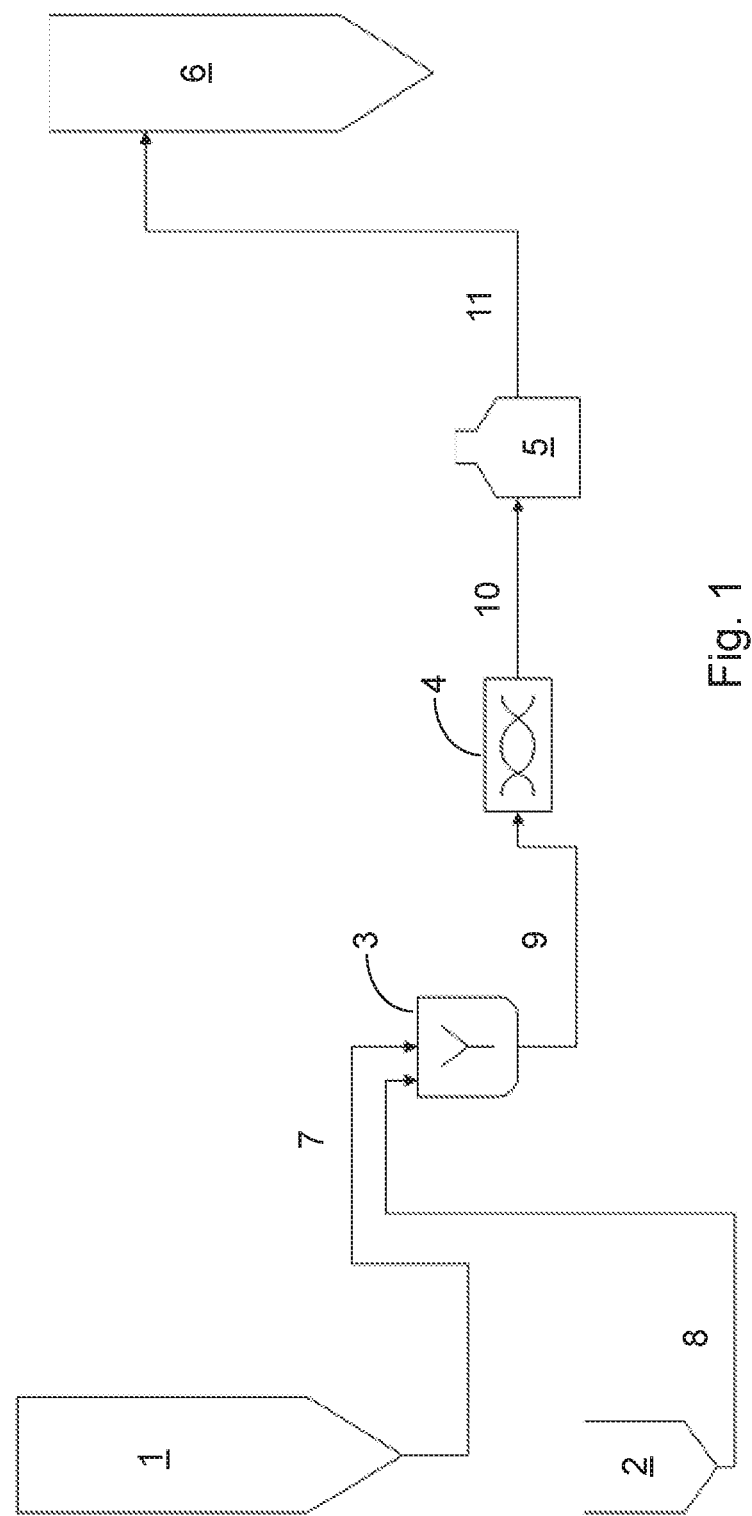
FIG. 1 is a schematic representation of a process for preparing a catalyst or a trapping mass according to the invention. In this preparation process, the active phase of the catalyst or of the trapping mass is supplied to the support in a single step, the precursor of the active phase being in the form of a metal salt comprising at least one metal belonging to groups VIB, VI IB, VIIIB, IB or IIB, of which the melting point of said metal salt is between 20° C. and 150° C.

In the following description, the groups of chemical elements are given according to the CAS classification (CRC Handbook of Chemistry and Physics, published by CRC Press, Editor in Chief D.R. Lide, 81st edition, 2000-2001). For example, group VIIIB according to the CAS classification corresponds to the metals from columns 8, 9 and 10 according to the new IUPAC classification.

Textural and structural properties of the support, of the catalyst or of the trapping mass described below are determined by the characterization methods known to those skilled in the art. The total pore volume and the pore distribution are determined in the present invention by mercury porosimetry (cf. Rouquerol F.; Rouquerol J.; Singh K. "Adsorption by Powders & Porous Solids: Principle, methodology and applications", Academic Press, 1999).

More particularly, the total pore volume is measured by mercury porosimetry according to the standard ASTM D4284-92 with a wetting angle of 140°, for example by means of an Autopore III™ model device from the brand Micromeritics™.

The specific surface area is determined in the present invention by the B.E.T. method, which method is described in the same reference book as the mercury porosimetry, and more particularly according to the standard ASTM D3663-03.

Preparation Process

According to the invention, the catalyst or the trapping mass comprises an active phase based on at least one metal from group VIB, VIIB, VIIIB, IB or IIB and a porous oxide support prepared by a preparation process comprising at least the following steps:
 a) said porous oxide support is brought into contact with at least one metal salt comprising at least one metal belonging to groups VIB, VIIB, VIIIB, IB or IIB, of which the melting point of said metal salt is between 20° C. and 150° C., for a period of between 5 minutes and 5 hours in order to form a solid mixture, the weight ratio of said metal salt to said porous oxide support being between 0.1 and 1;
 b) the solid mixture obtained at the end of step a) is heated with stirring at a temperature between the melting point of said metal salt and 200° C. and with a residence time of between 5 minutes and 12 hours;
 c) optionally, the solid obtained at the end of step b) is dried at a temperature below 200° C.;
 d) the solid obtained at the end of step b) or c) is calcined at a temperature above 200° C. and below or equal to 1100° C. under an inert atmosphere or under an oxygen-containing atmosphere.

The steps of the process for preparing the catalyst or the trapping mass according to the invention are described in detail below.

Step a)

According to step a) a porous support of oxide type is brought into contact with a metal salt comprising at least one metal belonging to groups VIB, VIIB, VIIIB, IB or IIB, of which the melting point of said metal salt is between 20° C. and 150° C., for a period of between 5 minutes and 5 hours in order to form a solid mixture, the weight ratio of said metal salt to said porous oxide support being between 0.1 and 1, preferably between 0.3 and 0.9. In this step, the metal salt is in solid form, i.e. said porous support and said metal salt are brought into contact at a temperature below the melting point of said metal salt.

According to step a), the porous support may comprise at least one refractory oxide chosen from the group consisting of oxides of magnesium, of aluminium, of silicon, of zirconium, of cerium, of thorium or of titanium, taken alone or as a mixture thereof, such as silica-alumina.

Preferably, the support is chosen from aluminas, silicas and silica-aluminas.

The support may also be a charcoal, a silicoaluminate, a clay or any other compound known for being used as a support.

Preferably, the support has a BET surface area of between 5 and 500 m$^2$/g, even more advantageously between 10 and 300 m$^2$/g. The BET specific surface area is measured by nitrogen physisorption.

The total pore volume of the support is generally between 0.1 and 3 cm$^3$/g, preferably between 0.3 and 1.5 cm$^3$/g.

The support may be shaped into beads, extrudates, trilobes, pellets, irregular and nonspherical agglomerates, the specific shape of which may result from a crushing step, powder with a particle size of between 10 and 500 μm or a monolith. Advantageously, said support is in the form of beads, extrudates or powder of micrometre particle size.

According to step a), at least one metal salt comprising at least one metal belonging to groups VIB, VIIB, VIIIB, IB or IIB, of which the melting point of said metal salt is between 20° C. and 150° C., is provided. Preferably, the metals are chosen from Zn, Cu, Ni, Fe, Co, Mn, taken alone or as a mixture. Preferably, the metal salt is hydrated. Preferably, the metal salt is a hydrated nitrate salt. Preferably, the metal salt is chosen from zinc nitrate trihydrate ($Zn(NO_3)_2 \cdot 3H_2O$, MP=45.5° C.), zinc nitrate hexahydrate ($Zn(NO_3)_2 \cdot 6H_2O$, MP=36.4° C.), copper nitrate trihydrate ($Cu(NO_3)_2 \cdot 3H_2O$, MP=114.5° C.), copper nitrate hexahydrate ($Cu(NO_3)_2 \cdot 6H_2O$, MP=26.4° C.), nickel nitrate hexahydrate ($Ni(NO_3)_2 \cdot 6H_2O$, MP=56.7° C.), iron nitrate nonahydrate ($Fe(NO_3)_3 \cdot 9H_2O$, MP=47.2° C.), cobalt nitrate hexahydrate ($Co(NO_3)_2 \cdot 6H_2O$, MP=55.0° C.), manganese nitrate tetrahydrate (Mn(NO$_3$)$_2$.4H$_2$O, MP=37.0° C.), manganese nitrate hexahydrate (Mn(NO$_3$)$_2$.6H$_2$O, MP=26.0° C.), taken alone or as a mixture.

According to step a), said porous oxide support and the cobalt metal salt may be brought into contact by any method known to those skilled in the art. Preferably, said porous support and the metal salt are brought into contact with contacting means chosen from convective mixers, drum mixers or static mixers. Step a) is carried out for a period of between 5 minutes and 5 hours depending on the type of mixer used, preferably between 10 minutes and 4 hours, and more preferentially still between 15 minutes and 3 hours.

In comparison with the prior art described in document U.S. Pat. No. 5,036,032 and that is based on contacting a support in a molten salt bath, step a) of the process according to the invention enables:

optimized control of the amount of metal deposited on the catalyst; and controlled hazardousness and cost of the preparation process by minimizing of the amounts of metal precursor used, not exceeding 1 gram of metal precursor per 1 gram of support.

Step b)

According to step b), the mixture obtained at the end of step a) is heated with stirring at a temperature between the melting point of the metal salt and 200° C. and at atmospheric pressure. The residence time is between 5 minutes and 12 hours, preferably between 5 minutes and 4 hours.

During step b), the mechanical homogenization of the mixture may be carried out by any method known to those skilled in the art. Preferably, use will be made of convective mixers, drum mixers or static mixers.

Step c) (Optional Step)

According to the optional step c), the drying of the solid obtained in step b) is carried out at a temperature below 200° C., advantageously between 50° C. and 180° C., preferably between 70° C. and 150° C., very preferably between 75° C. and 130° C.

The drying step is preferentially carried out for a maximum period of 4 hours, preferably under an inert atmosphere or under an oxygen-containing atmosphere.

The optional drying step may be carried out by any technique known to those skilled in the art. It is advantageously carried out at atmospheric pressure or at reduced pressure. Preferably, this step is carried out at atmospheric pressure. It is advantageously carried out using hot air or any other hot gas. Preferably, the gas used is either air, or an inert gas such as argon or nitrogen. Very preferably, the drying is carried out in the presence of nitrogen and/or air. Unlike step b), the drying step c) is not carried out with stirring by any means whatsoever.

Step d)

According to step d), the solid obtained in step b) or c) undergoes a calcination treatment at a temperature above 200° C. and below or equal to 1100° C., preferably between 250° C. and 650° C., under an inert atmosphere (nitrogen for example) or under an oxygen-containing atmosphere (air for example). The duration of this heat treatment is generally less than 16 hours, preferably less than 5 hours. After this treatment, the active phase is in oxide form and the solid contains no more or a very small amount of counterions and water of crystallization that were initially present in the metal salt. The calcining step may be carried out by any technique known to those skilled in the art. It is advantageously carried out in a crossed bed or in a fluidized bed using hot air or any other hot gas.

Catalyst or Trapping Mass

The catalyst or trapping mass prepared and used according to the invention contains from 1% to 60% by weight (calculated in oxide form) of one or more elements belonging to groups VIB, VIIB, VIIIB, IB or IIB relative to the total weight of the catalyst or of the trapping mass.

Preferably, said catalyst or trapping mass has a BET surface area of between 5 and 400 m$^2$/g, preferably between 10 and 300 m$^2$/g, and a total pore volume of between 0.1 and 1.5 cm$^3$/g, preferably between 0.3 and 1.0 cm$^3$/g.

Said catalyst or trapping mass is in the form of beads, extrudates, trilobes, pellets, irregular and nonspherical agglomerates, the specific shape of which may result from a crushing step, powder with a particle size of between 10 and 500 μm or a monolith. Advantageously, said catalyst or trapping mass is in the form of beads, extrudates or powder of micrometre particle size.

Use of the Catalyst or Trapping Mass

The present invention also relates to the use of such catalysts or trapping masses in industrial processes. Non-limitingly, in the field of catalytic processes, mention may notably be made of hydrogenation reactions of aromatic or polyaromatic compounds, selective hydrogenation reactions of polyunsaturated compounds, Fischer-Tropsch synthesis.

The use of said catalyst in a process for the hydrogenation of at least one aromatic or polyaromatic compound contained in a hydrocarbon feedstock having a final boiling point below or equal to 650° C. may be carried out in the gas phase or in the liquid phase, at a temperature of between 20° C. and 350° C., at a pressure of between 0.1 and 20 MPa, at a hydrogen/aromatic compounds molar ratio between 0.1 and 10 and at an hourly space velocity HSV (corresponding to the volume of feedstock per volume of catalyst and per hour) of between 0.05 h$^{-1}$ and 50 h$^{-1}$.

The use of said catalyst in the selective hydrogenation of polyunsaturated compounds is carried out by contacting a feedstock on the catalyst prepared according to the invention, it being possible for said feedstock to be selected from the group consisting of C3 steam-cracking cuts, C4 steam-cracking cuts, C5 steam-cracking cuts and steam-cracking gasolines, also referred to as pyrolysis gasolines. The selective hydrogenation may be carried out in the gas phase or in the liquid phase, preferably in the liquid phase. This is because a liquid-phase reaction makes it possible to lower the energy cost and to increase the cycle time of the catalysts.

For a liquid-phase selective hydrogenation reaction, the pressure is generally between 1 and 5 MPa, the hourly space velocity HSV is generally between 0.5 h$^{-1}$ and 50 h$^{-1}$, the temperature between 2° C. and 200° C. and the hydrogen/polyunsaturated compounds molar ratio between 0.1 and 4, preferably between 1 and 2.

For a gas-phase hydrogenation reaction, the pressure is generally between 1 and 3 MPa, the hourly space velocity HSV is generally between 500 h$^{-1}$ and 5000 h$^{-1}$, the temperature between 40° C. and 120° C. and the hydrogen/polyunsaturated compounds molar ratio between 0.1 and 4, preferably between 1 and 2.

The implementation of processes for hydrogenation of aromatic compounds and selective hydrogenation of polyunsaturated compounds is preferably carried out in a fixed bed.

The use of said catalyst in Fischer-Tropsch synthesis leads to the production of essentially linear and saturated C5+ hydrocarbons. The feedstock used for the implementation of the process of the invention comprises, preferably consists of synthesis gas. Synthesis gas is a mixture of carbon monoxide and hydrogen having $H_2/CO$ molar ratios that may vary in a ratio of from 0.5 to 4 depending on the process by which it was obtained. The $H_2/CO$ molar ratio of the synthesis gas is generally close to 3 when the synthesis gas is obtained from the hydrocarbon or alcohol steam reforming process. The $H_2/CO$ molar ratio of the synthesis gas is of the order of 1.5 to 2 when the synthesis gas is obtained from a partial oxidation process. The $H_2/CO$ molar ratio of the synthesis gas is generally close to 2.5 when it is obtained from a thermal reforming process. The $H_2/CO$ molar ratio of the synthesis gas is generally close to 1 when it is obtained from a process for gasification and reforming of $CO_2$.

The catalyst used in the hydrocarbon synthesis process according to the invention may be implemented in various types of reactors, for example fixed-bed, moving-bed, ebullated-bed or else three-phase fluidized-bed reactors. The implementation of the catalyst suspended in a three-phase fluidized reactor, preferentially of bubble column type, is preferred. In this preferred implementation of the catalyst, said catalyst is divided in the form of a very fine powder, particularly of the order of a few tens of microns, this powder forming a suspension with the reaction medium. This technology is also known under the "slurry" process terminology by a person skilled in the art.

The hydrocarbon synthesis process according to the invention is performed under a total pressure of between 0.1 and 15 MPa, preferably between 0.5 and 10 MPa, under a temperature of between 150° C. and 350° C., preferably between 180° C. and 270° C. The hourly space velocity is advantageously between 100 and 20 000 $h^{-1}$ and preferably between 400 and 10 000 $h^{-1}$.

Here again, nonlimitingly, in the field of processes for purifying gaseous or liquid effluents, mention may notably be made of the purification of liquid hydrocarbon feedstocks, natural gases, synthesis gases containing inter alia sulfur-containing impurities such as $H_2S$, COS, and/or $CS_2$, or halogenated impurities such as HCl. In these processes, the feedstock to be treated is bought into contact with the trapping mass in a reactor, which may be either a fixed-bed reactor, or a radial reactor, or else a fluidized-bed reactor.

In the context of the application relating to the desulfurization of gaseous and liquid feedstocks, the usage conditions of said trapping mass are preferably such that the pressure is between 0.1 and 25 MPa and the temperature between 100° C. and 450° C.

In the context of the application relating to the removal of halogenated compounds from a gaseous or liquid feedstock, the usage conditions of said trapping mass are preferably such that the pressure is between 0.1 and 10 MPa and the temperature between 20° C. and 190° C. Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1857940, filed Sep. 4, 2018 are incorporated by reference herein.

EXAMPLES

In order to illustrate the invention and to allow those skilled in the art to carry it out, various embodiments of the process for preparing cobalt-based supported catalysts for the use thereof in Fischer-Tropsch synthesis are presented below; however, this could not limit the scope of the invention which is applicable to any type of catalyst or trapping mass for the use thereof in any industrial process.

Example 1 (in Accordance with the Invention)

FIG. 1 illustrates a method for the industrial manufacture of a catalyst prepared by the preparation process according to the invention for a base "100 kg/h" of catalyst produced. In FIG. 1, only the main pieces of equipment are present, in particular the "additional" equipment dedicated to the transport of the solids between the steps and which are known to those skilled in the art (pneumatic transport, dosing hoppers, feed hoppers, conveying screws, etc.) have not been represented. In this example, the preparation process (in accordance with the invention) is carried out so as to deposit, in one step, around 13% by weight of Co on a silica-alumina initially containing 5% by weight of $SiO_2$ and 4% by weight of Co by means of the introduction of a cobalt aluminate spinel into said support. The silica-alumina has a mean particle size equal to 80 μm, a specific surface area of 180 $m^2/g$ and a pore volume of 0.55 ml/g. The cobalt contained in the spinel phase cannot be reduced during the final activation of the Fischer-Tropsch (reduction) catalyst. The cobalt contained in the spinel phase does not therefore constitute the active phase of the catalyst.

With reference to FIG. 1, a silica-alumina support stored in a storage unit 1 is supplied to a homogenization step 3 via the line 7 and a cobalt nitrate hexahydrate salt (Aldrich, >98%, ~20% by weight of Co) stored in a storage unit 2 is supplied to the homogenization step 3 via the line 8. The homogenization step is a drum mixer inclined at 45° and equipped with counter-blades to ensure a cascade movement during the mixing of the powders. The mixture is stirred at 60 rpm for 1 hour at ambient temperature and pressure. The solid mixture obtained is then sent via the line 9 to a heated vessel 4 (hot impregnator) in which the temperature is increased at 5° C./min up to 80° C. and left for 1 hour. The solid obtained is then sent to a calcining furnace 5 via the line 10 which furnace operates at 400° C. for 4 h in a crossed bed. The catalyst obtained containing 17.0% by weight of Co (in $Co_3O_4$ oxide form) relative to the weight of the catalyst is sent to a catalyst storage unit 6 via the line 11.

The flow rates indicated in Table 1 below correspond to continuous equivalent flow rates that make it possible to produce in fine a base "100 kg/h" of catalyst. Table 1 below lists the pieces of equipment and the main features thereof according to an example in accordance with the invention:

TABLE 1

List of equipment of the process according to the invention, capacity and heat absorbed of the process in accordance with the invention

| Reference | Equipment description | Sizing capacity (kg/h) | Heat absorbed (kW) |
|---|---|---|---|
| 1 | Storage of the catalytic support | 80 | — |
| 2 | Storage of salts | 65 | — |
| 3 | Homogenizer | 145 | — |
| 4 | Hot impregnator | 145 | 5 |
| 5 | Calcining furnace | 135 | 39 |
| 6 | Storage of final catalyst | 100 | — |

Example 2 (not in Accordance with the Invention)

According to the prior art, the high loading content of metal is achieved in two passes and requires the repetition of the successive steps of impregnating, drying and calcining. In terms of industrial operation, this may result in the presence of two sets of equipment (impregnator, dryer, calcining furnace), each being dedicated to one particular pass. In this example, the preparation process (not in accordance with the invention) is carried out so as to deposit, in two steps, around 13% by weight of Co on a silica-alumina initially containing 5% by weight of $SiO_2$ and 4% by weight of Co by means of the introduction of a cobalt aluminate spinel into said support. The silica-alumina has a mean particle size equal to 80 μm, a specific surface area of 180 $m^2/g$ and a pore volume of 0.55 ml/g. The cobalt contained in the spinel phase cannot be reduced during the final activation of the Fischer-Tropsch (reduction) catalyst. The cobalt contained in the spinel phase does not therefore constitute the active phase of the catalyst.

Figure 2:
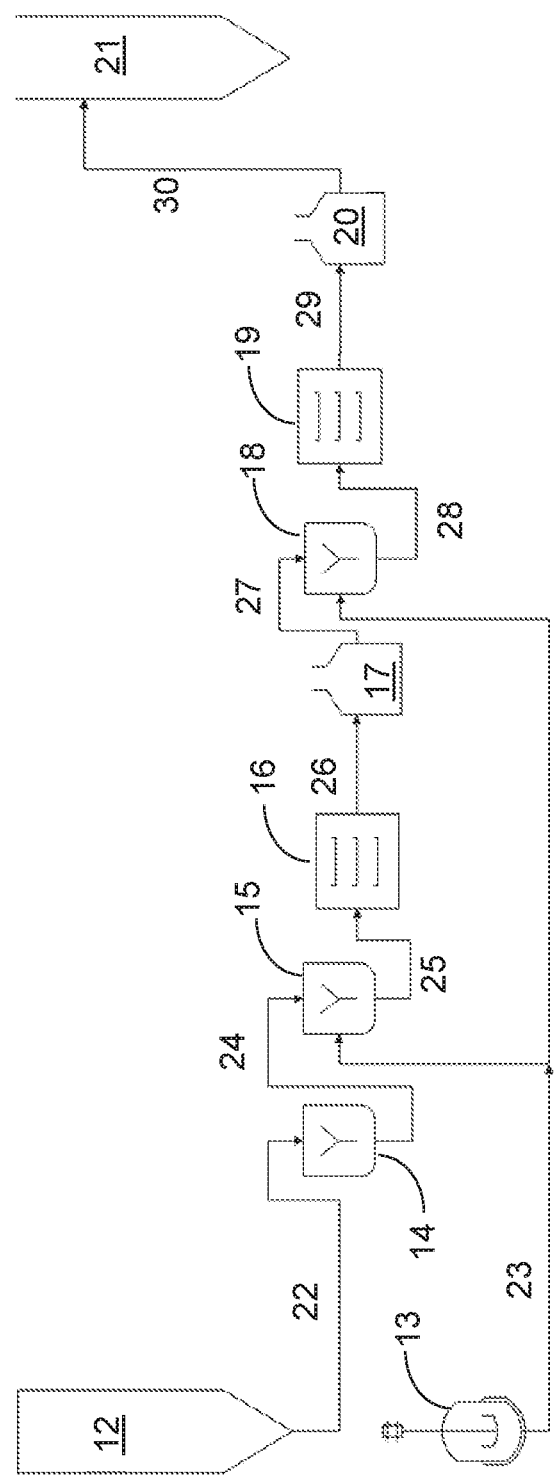
FIG. 2 is a schematic representation of a process for preparing a catalyst or a trapping mass according to the prior art. In this preparation process, the active phase of the catalyst or of the trapping mass is supplied to the support of the catalyst in the same proportions as in FIG. 1, but in two separate steps and with a precursor of the active phase that is in the form of an aqueous solution.

With reference to FIG. 2, a silica-alumina support stored in a storage unit 12 is supplied to a homogenization step 14 via the line 22. A step of impregnating an aqueous solution of cobalt nitrate (Orrion Chemicals Metalchem, ~13% by weight of Co) supplied via the line 23 on the silica-alumina support supplied via the line 24 is then carried out in an impregnation unit 15. The impregnated support is then sent to a drying unit 16 via the line 25. After drying at 120° C. for 3 hours, the solid is sent via the line 26 into a calcining furnace 17 operating at 400° C. for 4 hours in air. The catalyst obtained at the outlet of the calcining furnace is then sent via the line 27 to a second impregnation unit 18 in which an aqueous solution of cobalt nitrate (Orrion Chemicals Metalchem, ~13% by weight of Co) supplied via the line 23 is deposited on the catalyst. The impregnated catalyst is then sent to a drying unit 19 via the line 28. After drying at 120° C. for 3 hours, the solid is sent via the line 29 into a calcining furnace 20 operating at 400° C. for 4 hours in air. The catalyst obtained at the outlet of the calcining furnace is then sent via the line 30 to a catalyst storage unit 21. A catalyst which contains 17% by weight of Co (in $Co_3O_4$ oxide form) relative to the weight of the catalyst is obtained.

FIG. 2 illustrating such a method of manufacture has a continuous operation over the whole of the catalyst production line but with an increased number of main steps and pieces of equipment. Table 2 below lists the pieces of equipment and the main features thereof according to the example not in accordance with the invention:

TABLE 2

List of equipment of the process according to the invention, capacity and heat absorbed of the process not in accordance with the invention

| Reference | Equipment description | Sizing capacity (kg/h) | Heat absorbed (kW) |
|---|---|---|---|
| 12 | Storage of catalytic support | 80 | — |
| 13 | Impregnation solution storage tank | 92 | — |
| 14 | Homogenizer | 80 | — |
| 15 | Impregnator (pass 1) | 126 | — |
| 17 | Calcining furnace (pass 1) | 113 | 24 |
| 21 | Storage of final catalyst | 100 | — |
| 16 | Dryer (pass 1) | 126 | 13 |
| 18 | Impregnator (pass 2) | 138 | — |
| 19 | Dryer (pass 2) | 138 | 13 |
| 20 | Calcining furnace (pass 2) | 123 | 27 |

The comparison of examples 1 (in accordance) and 2 (not in accordance) shows a significant saving regarding:
- the number of main pieces of equipment used. Specifically, for the same loading of metal (17% by weight of cobalt in $Co_3O_4$ oxide form) and for similar capacities, a single impregnator and a single calcining furnace are needed in the preparation process according to the invention. Furthermore, according to this variant of the invention, the two drying units were able to be removed as they were not needed;
- the energy expenditures. The total heat of the process that is absorbed is reduced by a factor of between 1.5 and 2.0 (44 kW vs 77 kW). In the case of the preparation of a cobalt-based catalyst, the vaporization of "the water" from the cobalt nitrate solution (drying step within the context of example 2 not in accordance with the invention) requires a power considerably higher than that required for melting the cobalt salts (example 1 in accordance with the preparation process according to the invention).

The preparation process according to the invention therefore allows a major saving regarding the number of individual operations and regarding the energy expenditure. This results in a better efficiency of the industrial process (investment, utilities costs, maintenance, simplified operation).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process preparing a catalyst or a trapping mass, said catalyst or trapping mass consisting of a cobalt active phase and a porous silica-alumina support, said process consisting of:
   a) contacting said porous silica-alumina support with at least one solid metal salt cobalt metal, of which the melting point of said metal salt is between 20° C. and 150° C., for a period of between 5 minutes and 5 hours in order to form a solid mixture, the weight ratio of said metal salt to said porous silica-alumina support being between 0.1 and 1;
   b) heating the solid mixture obtained at the end of a) with stirring at a temperature of from the melting point of said metal salt to 200° C. and with a residence time of 5 minutes to 12 hours, whereby the metal salt is melted;
   c) optionally, drying the solid obtained at the end of b) at a temperature below 200° C.; and
   d) calcining the solid obtained at the end of b) or c) at a temperature above 200° C. and below or equal to 1100° C. under an inert atmosphere or under an oxygen-containing atmosphere.

2. The process according to claim 1, in which the metal salt is a hydrated nitrate salt.

3. The process according to claim 2, in which said metal salt is cobalt nitrate hexa hydrate.

4. The process according to claim 1, in which the weight ratio of said metal salt to the porous silica-alumina support is 0.3 to 0.9.

5. The process according to claim 1, in which a) is carried out for 10 minutes to 4 hours.

6. The process according to claim 1, in which the calcining time of d) is less than 16 hours.

7. The process according to claim 1, in which said porous silica-alumina support is in the form of a powder having a particle size of 10 to 500 μm.

8. The process according to claim 1, in which said porous silica-alumina support comprises a specific surface area of 5 to 500 m²/g.

9. The process according to claim 1, in which said porous silica-alumina support has a total pore volume of 0.3 to 3 ml/g.

* * * * *